United States Patent

Weigel

[11] Patent Number: 6,152,607
[45] Date of Patent: Nov. 28, 2000

[54] OPTICAL CONNECTOR HOUSING HOLDER

[75] Inventor: Hans-Dieter Weigel, Caputh, Germany

[73] Assignee: Infineon Technologies AG, Munich, Germany

[21] Appl. No.: 09/390,169

[22] Filed: Sep. 7, 1999

Related U.S. Application Data

[63] Continuation of application No. PCT/DE98/00609, Mar. 2, 1998.

[51] Int. Cl.[7] .................................................. G02B 6/38
[52] U.S. Cl. .............................. 385/56; 385/59; 385/78
[58] Field of Search ................... 385/53, 55, 56, 385/58, 59, 60, 62, 66, 76–78, 81, 84, 88–90, 92, 94, 139

[56] References Cited

U.S. PATENT DOCUMENTS 5,553,180   9/1996   Belenkiy et al. ........................ 385/59
5,574,812  11/1996   Beier et al. ............................ 385/78

FOREIGN PATENT DOCUMENTS 0 408 852 A2   1/1991   European Pat. Off. .
   91 02 805   7/1991   Germany .
43 02 826 C1   3/1994   Germany .

Primary Examiner—John D. Lee
Assistant Examiner—Michelle R. Connelly-Cushwa
Attorney, Agent, or Firm—Herbert L. Lerner; Laurence A. Greenberg; Werner H. Stemer

[57] ABSTRACT

A holder includes two receptacles, each for receiving an optical connector housing. At least one optical connector housing is mounted in its receptacle along the longitudinal axis of the receptacle with radial play in a direction transverse to the insertion direction. To facilitate handling and to prevent rattling of the optical connector housing, at least one flexible element acts on the optical connector housing that is mounted with play and brings the connector housing into a defined rest position.

6 Claims, 1 Drawing Sheet

OPTICAL CONNECTOR HOUSING HOLDER

CROSS-REFERENCE TO RELATED APPLICATION

This is a continuation of copending International Application No. PCT/DE98/00609, filed Mar. 2, 1998, which designated the United States.

BACKGROUND OF THE INVENTION

FIELD OF THE INVENTION

The invention lies in the field of optical fiber technology. The invention relates to a connector for fiber optics cables. Optical connection occurs through individual fiber optic connectors provided at the ends of optical fibers for optically coupling the connectors to corresponding fibers, in particular SC connectors, and which, for example, in pairs form a duplex connector. The invention concerns a holder with at least two receptacles, each receptacle receiving a housing of an optical connector, with at least one of the connector housings being mounted in its receptacle with lateral play in a direction transverse to its longitudinal axis.

German Utility Model G 91 02 805.1 discloses a two-part holder with two receiving chambers. The inner profile of the receiving chambers exactly matches the outer profile of a respective connector housing to be received. The connector housings are held such that there is no play in the connection.

European published patent application no. EP 0 408 852 A2 discloses a holder with two receptacles, each receptacle receiving a single optical connector housing, with a connector housing fixed in each receptacle. To permit relative radial movement of the connectors with respect to one another, the receptacles are interconnected by a resilient element. Although the connection has the effect of insuring adequate radial mobility (a requirement of widely adopted standards, i.e., ANSI X3T9), a relatively large space is required for the resilient element between the two receptacles. For handling, the prior art holder must be gripped at the resilient element, causing undesirable compression and/or hindering the relative radial mobility of the receptacles.

U.S. Pat. No. 5,574,812 to Beier et al., corresponding to German Patent No. DE 43 02 826 C1, discloses a simple holder that can be handled in a user-friendly way. On the inside of the receptacles are holding means. The internal dimensions of the receptacles and the holding means are made to match the corresponding external dimensions and contours of the respective connector housing received. The connector housing held in the receptacle and, consequently, the connector received by the housing, is mounted such that the connector housing is laterally movable in a direction transverse to its longitudinal axis. With relative radial mobility of the connector housings with respect to one another, this prior art holder nevertheless allows easy handling and is comparatively simple to produce. Furthermore, the holder is reduced in size.

However, in the unplugged or uninserted state, a duplex connector configuration created using the holder of Beier et. al. has unrestricted radial play of the connector housings, or of the individual connectors contained in them, with respect to one another. This feature is entirely desired because it allows for compensation for tolerances during insertion. As a result, the individual connectors assume a random, undefined position in relation to one another, for example, a non-parallel alignment. Due to the non-parallel alignment, the coupling or insertion of the individual connectors received by the holder may be problematical. In practice, the non-parallel alignment could cause irritation because mounting with play can lead to rattling noises, with the result that the function and reliability of the entire connector configuration is unjustifiably cast in doubt.

U.S. Pat. No. 5,553,180 to Belenkiy et al. discloses an improved two-part holder with two receiving chambers, as compared with the above mentioned prior art. In the Belenkiy holder, at least one flexible element additionally acts on the connector housings, mounted in the chambers with play, such that the connector housings are brought into a defined resting position from which they can be deflected against the force of the flexible element. The resting position prevents the connector housings mounted with play from causing noise when unplugged.

However, a problem with the Belenkiy holder still remains. This problem occurs when the holder is handled improperly, for example, by taking hold of the holder configuration in the rear region of the connector housings. Under improper handling, comparatively severe splaying apart of the connectors occurs. The splaying may lead to difficulties in further handling and to the requirement of an increased force necessary for insertion.

SUMMARY OF THE INVENTION

It is accordingly an object of the invention to provide a holder that overcomes the hereinafore-mentioned disadvantages of the heretofore-known devices of this general type and that continues to have a simple and space-saving construction, to insure a predetermined, rattle-free rest position for the connector housings and to require only low centering or aligning forces during insertion.

With the foregoing and other objects in view, there is provided, in accordance with the invention, a holder, including a holding body having two connector housing receiving chambers formed therein, each of the receiving chambers configured to receive a connector housing in an insertion direction and having two means for holding the connector housing in a respective one of the receiving chambers, a respective rear one of the two means for holding spaced apart behind a front one of the two means for holding in the insertion direction, each of the two means for holding formed to interact with corresponding holding means of the respective connector housing for releasably mounting the connector housing in a respective one of the receiving chambers with play in a direction transverse to the insertion direction; and at least one flexible element having an effective region closer to the respective front one of the two means for holding than to the respective rear one of the two means for holding, the at least one flexible element connected to each of the receiving chambers for applying a force upon each inserted connector housing in the corresponding effective region of the connector housing such that the connector housing is aligned into a defined rest position within the respective one of the receiving chambers.

The objective of the invention is achieved by the holder having two holding means lying one behind the other in the direction of insertion for each receiving chamber and by the effective region of the flexible element lying closer to the holding means at the front end of each receiving chamber than to the holding means at the rear end of each receiving chamber, with respect to the insertion direction. The configuration of the invention is particularly advantageous with regard to the mechanical loading of the connectors and the insertion forces required during the coupling operation.

In a preferred embodiment of the invention, the force produced by the flexible element may be configured for further improving the insertion properties such that the flexible element acting together with stops within the receptacles aligns the connector housings parallel to the longitudinal axis.

In accordance with another feature of the invention, each of the two means for holding the connector housing in a respective one of the receiving chambers has a stop surface for counteracting the force produced by the flexible element upon the connector housings to align the connector housings parallel to the insertion direction.

It is particularly preferred, in terms of technical aspects of production and assembly, for the holding means and the stops to be formed by corresponding projections and recesses. It is particularly preferred for the flexible element to be a compression spring.

In accordance with a concomitant feature of the invention, the flexible element is a compression spring.

Other features that are considered as characteristic for the invention are set forth in the appended claims.

Although the invention is illustrated and described herein as embodied in a holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
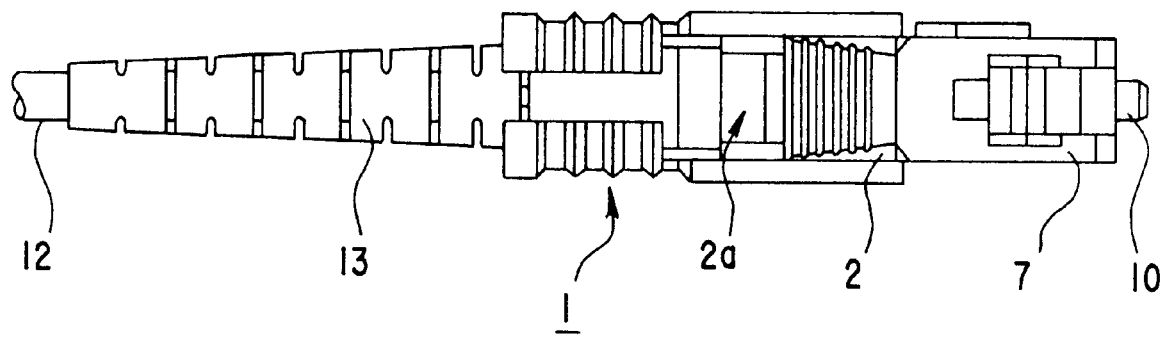
FIG. 1 is a diagrammatic side view of the holder according to the invention holding an SC connector.
Figure 2:
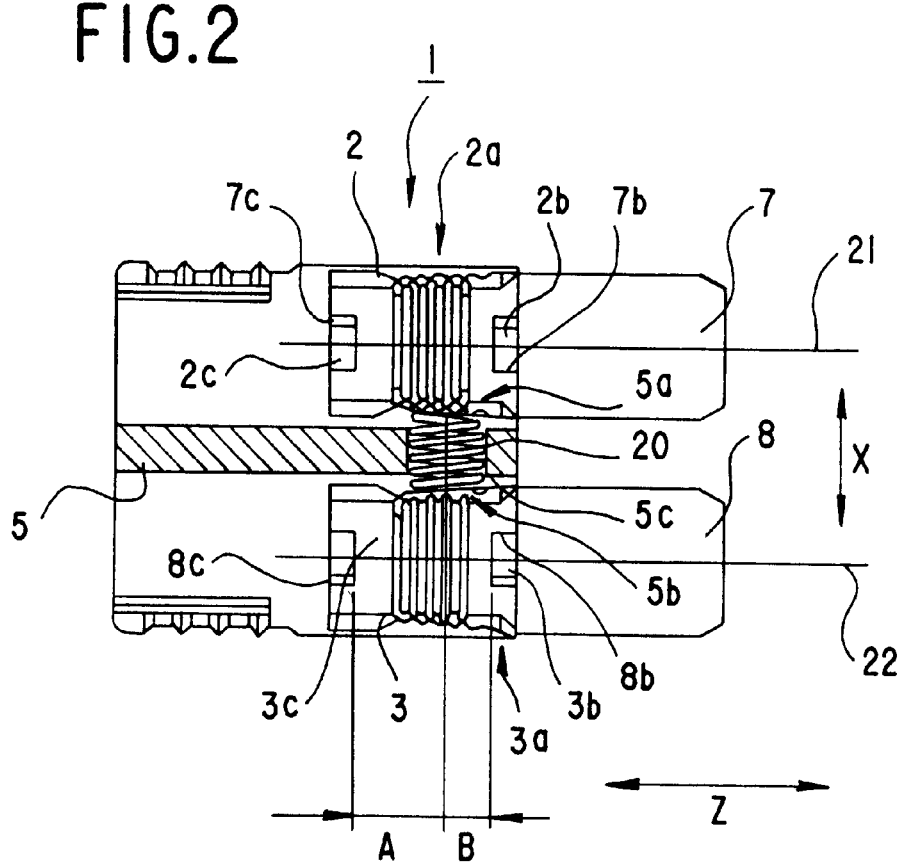
FIG. 2 is a diagrammatic, horizontal, longitudinal-sectional view of the holder only showing connector housings.

Referring now to the figures of the drawings in detail, FIGS. 1 and 2 show a holder 1 corresponding in its basic construction to, for example, the holder disclosed in Beier et. al. The holder 1 includes two receptacles 2, 3 (FIG. 2) of a substantially C-shaped cross section each of which having one open side 2a, 3a. The receptacles 2, 3 have an approximately mirror-image construction and are separated by a common central web 5. A single optical connector housing 7, 8 can be introduced into each receptacle 2, 3 beginning at the openings of the receptacles 2, 3 (also referred to as the front side of the connector housings) and ending at the rear side of the receptacles 2, 3 along an insertion direction Z (FIG. 2). FIG. 1 shows a connector pin 10 held in the connector housing 7 in a conventional manner and having an optical fiber end located in a central bore of the connector pin 10. Also shown in FIG. 1 is an anti-kink sleeve 13, surrounding the outgoing fiber optics cable 12.

As explained in detail in U.S. Pat. No. 5,574,812 to Beier et al., the disclosure of which is incorporated herein by reference, projections 2b, 2c; 3b, 3c on the inside of the receptacles engage in corresponding recesses 7b, 7c; 8b, 8c formed on the upper and lower outer surfaces (not shown in greater detail in FIGS. 1 or 2) of the connector housings 7, 8. The internal dimensions of the receptacles 2, 3 are made greater, at least in the lateral direction X in FIG. 2, than the corresponding external dimensions of the housings 7, 8. The projections 2b, 2c; 3b, 3c are made smaller, at least in the X direction, with respect to the corresponding dimensions of the corresponding recesses 7b, 7c; 8b, 8c such that the connector housings 7, 8 have play and are movable at least in the X direction transverse to the longitudinal direction (insertion direction Z). The projections 2b, 2c; 3b, 3c each have a bevel that faces the open side 2a or 3a, respectively, and comes into contact first with the edges of the connector housings 7, 8 during lateral introduction of the connector housings 7, 8 along the insertion direction Z. As this happens, the legs of the C-shaped receptacles 2, 3 spread apart (as they are formed to provide a prestress against the connector housings 7, 8) and allow the connector housings 7, 8 to be inserted into the receptacles 2, 3. When the connector housings 7, 8 have been fully inserted into the receptacles 2, 3, the projections 2b, 2c; 3b, 3c snap into the corresponding recesses 7b, 7c; 8b, 8c on the connector housings 7, 8 and hold the connector housings 7, 8 captive in the receptacles 2, 3. The projections 2b, 2c; 3b, 3c have stop surfaces that face away from the open side 2a or 3a, respectively, and in each case interact with a bounding surface of the adjacent recess and limit the radial mobility of the housings toward the open side. The common central web 5 limits the radial movement of the connector housings 7, 8 in opposite directions towards one another. The play between the stop and the bounding surface has been chosen in the present example to be 0.5 mm in each case, resulting in a total individual connector housing 7, 8 movability of 1 mm in the X direction. Additional mobility can be achieved in the direction orthogonal to the X and Z directions by making the corresponding connector housing dimensions and the height of the projections or the depth of the recesses to provide mounting with play in that orthogonal direction.

A flexible element 20 (FIG. 2), preferably configured as a helical compression spring, protrudes into the receptacles 2, 3 that are holding the connector housings 7, 8 with play. The compression spring 20 is disposed in a through-bore 5c of the central web 5 and is fixed, for example by an appropriate fit, and secured against slipping out. The compression spring 20 exerts a pressure on both connector housings 7, 8, the pressure acting respectively in the direction of the open sides 2a or 3a, resulting in the abutment of the corresponding stop surfaces of the projections 2b, 2c; 3b, 3c and the recesses 7b, 7c; 8b, 8c. The configuration and planar shaping of the stop surfaces have the effect that the connector housings 7, 8, and consequently the connector pins 10 held in them (FIG. 1), are pre-aligned with their longitudinal axes 21, 22 axially parallel in the insertion direction Z.

The connector holders 2c, 7c or 3c, 8c (projections and recesses) disposed at the rear side of the connector housings 7, 8 in the insertion direction Z, respectively, are at a distance A from the regions 5a, 5b where the compression spring 20 acts upon the connector housings 7, 8. The connector holders 2b, 7b or 3b, 8b disposed at the front side of the connector housings 7, 8, respectively, are at a distance B from the regions 5a, 5b where the compression spring 20 acts upon the housings 7, 8. The distance B is less than the distance A. Accordingly, the action regions 5a, 5b lie closer to the connector holders 2b, 7b or 3b, 8b on the front side than to the connector holders 2c, 7c or 3c, 8c disposed at the rear side. The configuration results in a reduction of the centering forces required during insertion of the holder fitted with individual SC connectors, with any compensation for tolerance, and a reduction to a negligible amount of the prestressing forces that must be overcome to insert the connectors.

Axially parallel pre-alignment of the connector pins is insured by prestressing the connector housings 7, 8 into the rest position shown in FIG. 2, leading to easier handling. In addition, the connector housings 7, 8 are no longer able to move freely when unplugged, thereby avoiding rattling noise. Nevertheless, the holder according to the invention is robust and provides an extremely simple construction. According to the embodiment of FIG. 2, the holder requires only a single additional element, namely the helical compression spring 20. However, plastic bodies, rubber bushes, or rubber plugs may also be considered for the element.

I claim:

1. A holder, comprising:

a holding body having two connector housing receiving chambers formed therein each for receiving a respective connector housing in an insertion direction, and having two holding devices for holding the connector housing in a respective one of said receiving chambers, said holding devices including a forward holding device and a rear holding device spaced behind said forward holding device in the insertion direction, each of said two holding devices formed to interact with corresponding holding devices of the respective connector housing for releasably mounting the connector housing in a respective one of said receiving chambers with play in a direction transverse to said insertion direction; and a flexible element having an effective region closer to said forward holding device than to said rear holding device, said flexible element being connected to said receiving chambers for applying a force upon each inserted connector housing in the corresponding effective region of the connector housing such that the connector housing is aligned into a defined rest position within the respective one of said receiving chambers.

2. The holder according to claim 1, wherein each of said two holding devices is formed with a stop surface for counteracting the force of said flexible element upon the connector housings to align the connector housings parallel to said insertion direction.

3. The holder according to claim 1, wherein said flexible element is a compression spring.

4. The holder according to claim 1, wherein said flexible element is a plastic body.

5. The holder according to claim 1, wherein said flexible element is a rubber bushing.

6. The holder according to claim 1, wherein said flexible element is a rubber plug.

* * * * *